(12) United States Patent
Tsay

(10) Patent No.: US 6,353,546 B1
(45) Date of Patent: Mar. 5, 2002

(54) COILLESS AC/DC POWER SUPPLY DEVICE

(75) Inventor: Wen-Chin Tsay, Hsinchu (TW)

(73) Assignee: Miracle Technology Co., Ltd., Hsinchu (TW)

( * ) Notice: Subject to any disclaimer, the term of this patent is extended or adjusted under 35 U.S.C. 154(b) by 0 days.

(21) Appl. No.: 09/753,463

(22) Filed: Jan. 4, 2001

(51) Int. Cl.[7] .............................................. H02M 5/42
(52) U.S. Cl. ...................................................... 363/89
(58) Field of Search .............................. 363/52, 53, 78, 363/81, 84, 89, 125, 127; 323/266, 271, 273, 275, 276, 282, 285

(56) References Cited

U.S. PATENT DOCUMENTS

| | | | | |
|---|---|---|---|---|
| 3,863,135 A | * | 1/1975 | Atwood et al. | 321/15 |
| 5,666,255 A | * | 9/1997 | Muelleman | 361/111 |
| 6,061,259 A | * | 5/2000 | DeMichele | 363/125 |
| 6,169,391 B1 | * | 1/2001 | Lei | 323/266 |

* cited by examiner

*Primary Examiner*—Matthew Nguyen
(74) *Attorney, Agent, or Firm*—Rosenberg, Klein & Lee

(57) ABSTRACT

The present invention provides a coilless AC/DC power supply device, comprising: an AC voltage input terminal; a rectifier circuit used to receive and rectifier the input AC voltage so as to output a rectified DC voltage; a charging device, connected to the rectifier circuit at its input terminal and connected to the load at its output terminal; and a voltage detecting device, connected to the output terminal of the charging device at its input terminal and connected in a feedback configuration to the control input terminal of the charging device. In other words, the AC voltage is input into the input terminal and then is performed with full-wave or half-wave rectification by the rectifier circuit exemplified by a bridge full-wave rectifier circuit, so as to obtain a DC voltage. In the present invention, a transformer is not necessary during voltage leveling process. Therefore, complicated winding fabrication is omitted which leads to a reduced fabrication cost. On the other hand, such an AC/DC power supply device is downsized and can be integrated with other application circuits.

13 Claims, 5 Drawing Sheets

COILLESS AC/DC POWER SUPPLY DEVICE

BACKGROUND OF THE INVENTION

1. Field of the Invention

The present invention generally relates to a coilless AC/DC power supply device, and more particularly, to an AC/DC power supply device, in which the AC voltage is converted into the desired DC voltage by rectification and voltage leveling process. In the present invention, a transformer is not necessary during voltage leveling process. Therefore, complicated winding fabrication is omitted which leads to a reduced fabrication cost. On the other hand, such an AC/DC power supply device is downsized and can be integrated with other application circuits.

2. Description of the Prior Art

Due to the downsizing trend as well as the fast developing techniques of modern electronic products, feasibility of realization of compact electronic products is made possible. For most of the conventional electronic products, the power required is provided by converting the AC voltage into the desired DC voltage. On the other hand, in larger scale IC applications, matching condition of the supplied power must be also taken into consideration. However, most of the modern electronic products are provided with power by the conventional AC/DC power supply device composed of a transformer and a rectifier circuit. Please refer to FIG. 1, which is a schematic circuit diagram illustrating a conventional AC/DC power supply device in the prior art. As shown in the drawing, an AC voltage is input into the transformer $T_1$ where the AC voltage is transformed and then delivered to a node a. Then, a bridge full-wave rectifier compose of a diodes $D_1$, $D_2$, $D_3$ and $D_4$ performs full-wave rectification upon the AC voltage and the AC voltage is converted into a DC voltage delivered to a node b. The DC voltage charges a capacitor $C_1$ and then outputs a DC voltage $V_{DC}$ across a load resistor $R_L$. Therefore, the voltage conversion is accomplished.

However, the above mentioned conventional AC/DC power supply device requires two complicated coils, electrically insulated from each other but wound on the same core to construct a transformer $T_1$. Therefore, the size of such an AC/DC power supply device is limited and mismatches the downsizing trend of modem ID techniques.

SUMMARY OF THE INVENTION

It is therefore a main object of the present invention to provide a coilless AC/DC power supply device, which controls the voltage level of the required power using a voltage detecting device and a matching rectifier circuit so as to provide a reliable power source without needing a transformer composed of coils.

It is another object of the present invention to provide a coilless AC/DC power supply device, wherein the coilless design not only downsize the AC/DC power supply device but also make it possible to be integrated with other application circuits.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

Figure 1:
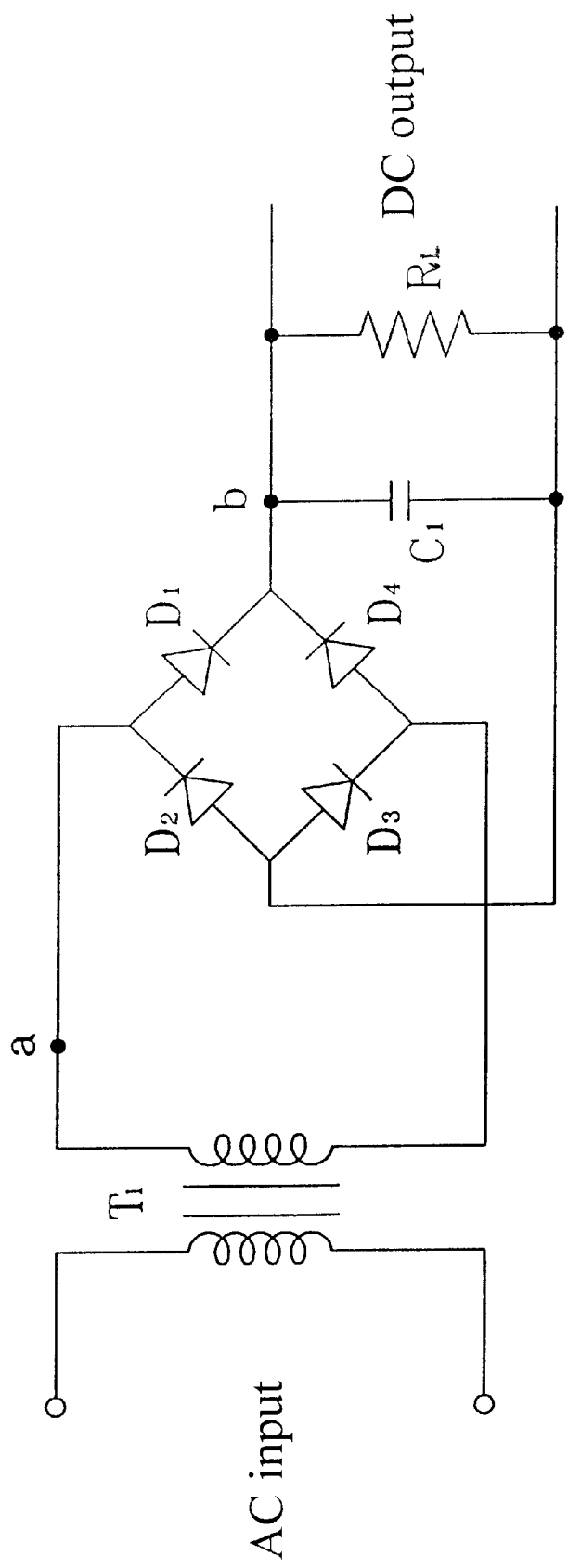
FIG. 1 is a schematic circuit diagram illustrating a convention AC/DC power supply device in the prior art.
Figure 2:
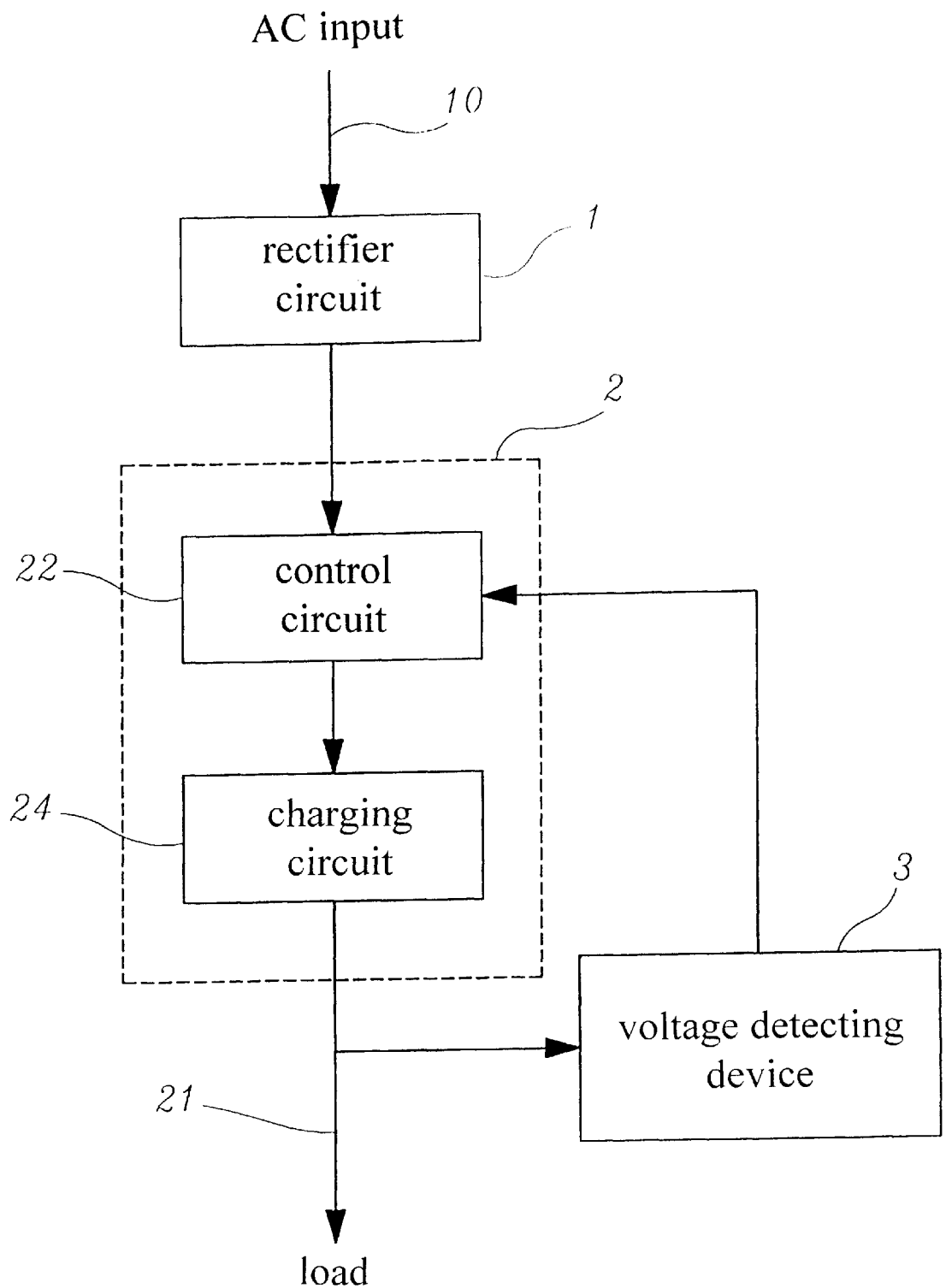
FIG. 2 is a schematic block diagram showing an AC/DC power supply device in accordance with one preferred embodiment of the present invention.

To begin with, please refer to FIG. 2, which is a schematic block diagram showing an AC/DC power supply device in accordance with one preferred embodiment of the present invention. As shown in the drawing, the AC/DC power supply device comprises a rectifier circuit 1, a charging device 2, and a voltage detecting device 3. The input terminal 10 of the rectifier circuit 1 is used to receive the input AC voltage and the output terminal of the rectifier circuit 1 is connected to the charging device 2. The charging device 2 includes a control circuit 22 and a charging circuit 24, wherein the output 21 of the charging device 2 is connected to the load so as to provide the DC voltage and is also connected to the voltage detecting device 3, which is further connected in a feedback configuration to the control input terminal of the charging device 2. In other words, the AC voltage is input into the input terminal 10 and then is performed with fullwave or half-wave rectification by the rectifier circuit 1 exemplified by a bridge full-wave rectifier circuit, so as to obtain a DC voltage. Then, the DC voltage is delivered into the charging device 2 and then output as a DC voltage $V_{DC}$ across a load resistor $R_L$. The control of the voltage level is carried out in the voltage detecting device 3 by comparing to a reference voltage, so as to limit the range of the output DC voltage.

Figure 3:
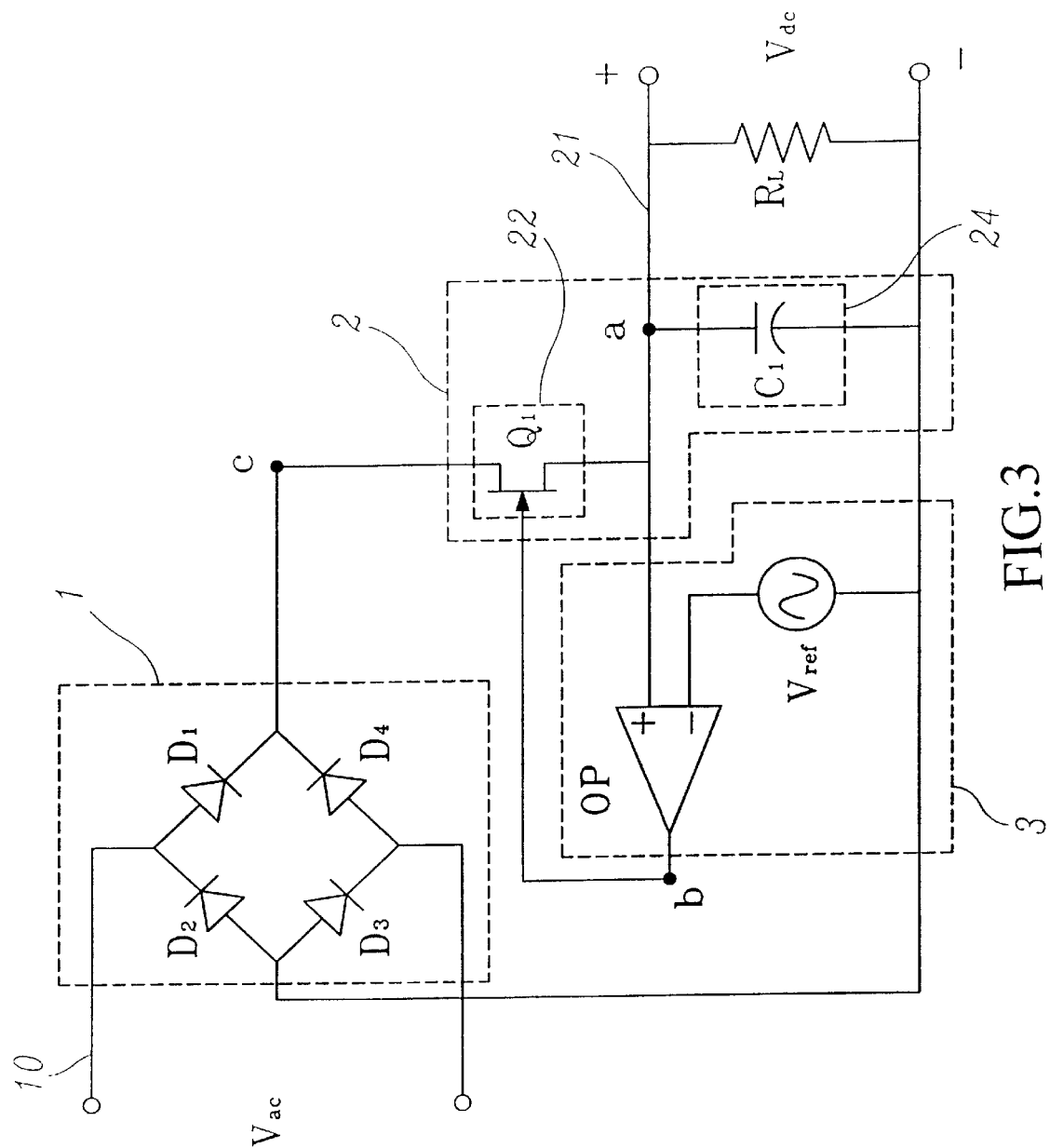
FIG. 3 is a detailed circuit diagram showing an AC/DC power supply device in accordance with one preferred embodiment of the present invention.

Please further refer to FIG. 3, which is a detailed circuit diagram showing an AC/DC power supply device in accordance with one preferred embodiment of the present invention. As shown in the drawing, a depletion-mode (n-JFET) $Q_1$ is turned on when the voltage difference between node a and node b is equal to zero or the voltage at node b is larger than zero; on the contrary, the n-JFET $Q_1$ is turned off when the voltage at node b is equal to the ground voltage. Moreover, an operational amplifier $OP_1$ is used as a comparison circuit. When the voltage at its positive input terminal is higher than the reference voltage $V_{ref}$ at its negative input terminal, the operational amplifier $OP_1$ outputs a high voltage logic signal, making the voltage at node b equal to the ground voltage; otherwise, the operational amplifier $OP_1$ outputs a low voltage logic signal, making the voltage at node b equal to that at node a. Therefore, when an AC voltage $V_{AC}$ is input and then rectified by a bridge full-wave rectifier composed of diodes $D_1$, $D_2$, $D_3$ and $D_4$, the voltage at node a is almost zero. Meanwhile, the voltage at the positive input terminal of the operational amplifier $OP_1$ is lower than that at the negative input terminal of the operational amplifier $OP_1$, the operational amplifier $OP_1$ outputs a low voltage logic signal to node b, making the n-JFET $Q_1$ turned on, and a capacitor $C_1$ starts to charge. When the voltage at node a is charged to be higher than the reference voltage $V_{ref}$ at the negative input terminal of the operational amplifier $OP_1$, the operational amplifier $OP_1$ outputs a high voltage logic signal to node b, making the n-JFET $Q_1$ open-circuit. Therefore, the voltage at node a can be kept at a stable value $V_{DC}$ and be output to the load resistor $R_L$.

Furthermore, the n-JFET can be replaced by other depletion-mode transistors such an n-MOSFET that can be turned on at zero voltage. Enhancement-mode transistors such as p-JFET and p-MOSFET that can be turned on under reverse bias can also be used for the same purpose.

Figure 4:
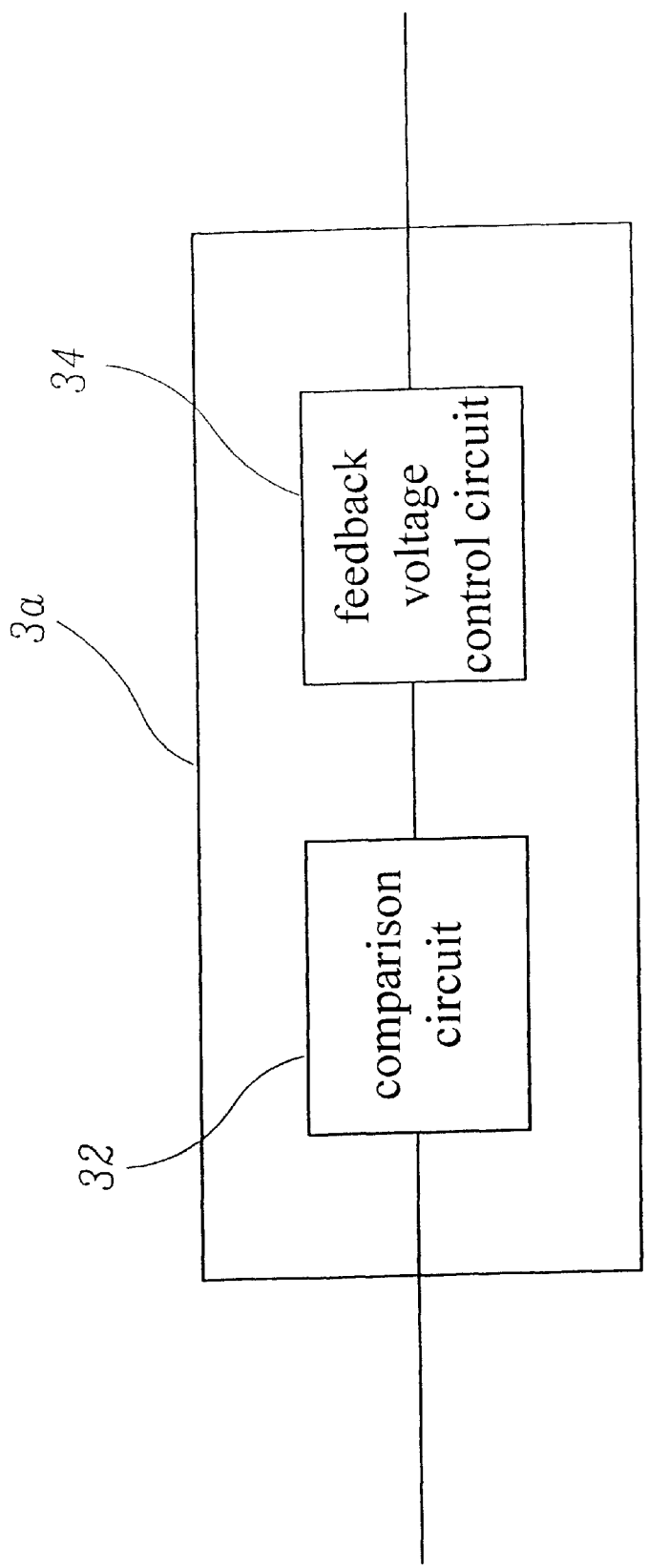
FIG. 4 is a schematic block diagram showing a voltage detecting device 3a in accordance with another preferred embodiment of the present invention.

Furthermore, please refer to FIG. 4, which a schematic block diagram showing a voltage detecting device 3a in accordance with another preferred embodiment of the present invention. As shown in the drawing, the voltage detecting device 3a comprises a comparison circuit 32, connected to the reference voltage source at one of its input terminals and connected to the output terminal of the charging circuit of the charging device; and a feedback voltage control circuit 34, connected in a feedback configuration to the input control terminal of the control circuit of the charging device, so as to compare the voltage of the charging element of the charging device with the voltage of the reference voltage source. The feedback voltage control circuit 34 can be implemented by using a plurality of depletion-mode transistors such as p-MOS transistors and n-MOS transistors.

Figure 5:
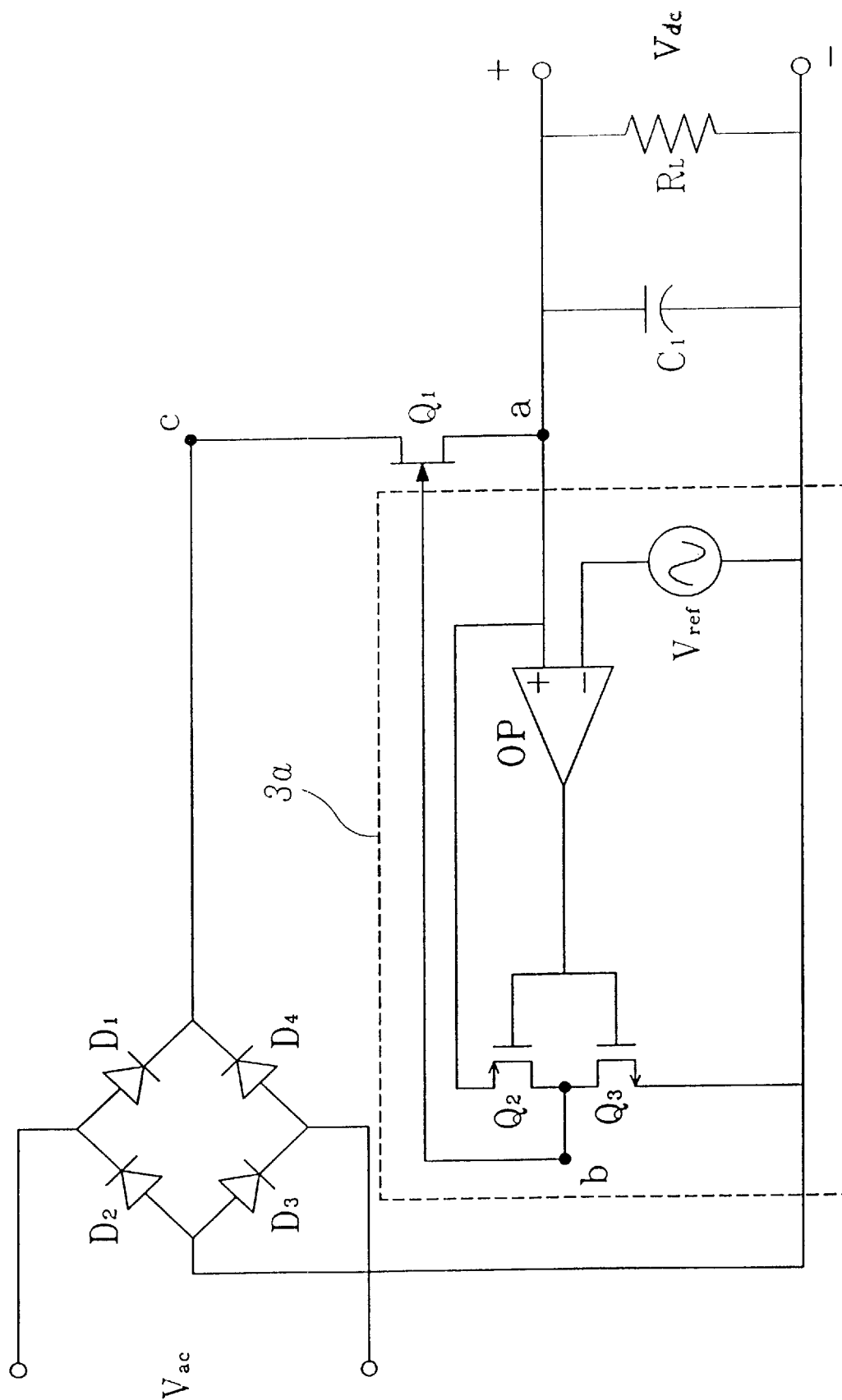
FIG. 5 is a detailed circuit diagram showing an AC/DC power supply device in accordance with another preferred embodiment of the present invention.

Please refer to FIG. 5, which is a detailed circuit diagram showing an AC/DC power supply device in accordance with another preferred embodiment of the present invention. As shown in the drawing, a depletion-mode (n-JFET) $Q_1$ is turned on when the voltage difference between node a and node b is equal to zero or the voltage at node b is larger than zero; on the contrary, the n-JFET $Q_1$ is turned off when the voltage at node b is equal to the ground voltage. Moreover, an operational amplifier $OP_1$ is used as a comparison circuit. When the voltage at its positive input terminal is higher than the reference voltage $V_{ref}$ at its negative input terminal, the operational amplifier $OP_1$ outputs a high voltage logic signal, making the voltage at node b equal to the ground voltage; otherwise, the operational amplifier $OP_1$ outputs a low voltage logic signal, making the voltage at node b equal to that at node a. Therefore, when an AC voltage $V_{AC}$ is input and then rectified by a bridge full-wave rectifier composed of diodes $D_1$, $D_2$, $D_3$ and $D_4$, the voltage at node a is almost zero. Meanwhile, the voltage at the positive input terminal of the operational amplifier $OP_1$ is lower than the that at the negative input terminal of the operational amplifier $OP_1$, the operational amplifier $OP_1$ outputs a low voltage logic signal, making the p-MOS transistor $Q_2$ turned on, the n-MOS transistor $Q_3$ turned off and the voltage at node a equal to that at node b. Therefore, the n-JFET $Q_1$ turned on, and a capacitor $C_1$ starts to charge. When the voltage at node a is charged to be higher than the reference voltage $V_{ref}$ at the negative input terminal of the operational amplifier $OP_1$, the operational amplifier $OP_1$ outputs a high voltage logic signal to node b, making the p-MOS transistor $Q_2$ turned off, the n-MOS transistor $Q_3$ turned on and the voltage at node b equal to the ground voltage. Meanwhile, the n-JFET $Q_1$ turned off, and thus the voltage at node a can be kept at a stable value $V_{DC}$ and be output to the load resistor $R_L$.

As discussed so far, in accordance with the present invention, there is provided an AC/DC power supply device, in which the AC voltage is converted into the desired DC voltage by rectification and voltage leveling process. In the present invention, a transformer is not necessary during voltage leveling process. Therefore, complicated winding fabrication is omitted which leads to a reduced fabrication cost. On the other hand, such an AC/DC power supply device is downsized and can be integrated with other application circuits. Consequently, the present invention has been examined to be progressive and has great potential in commercial applications.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A coilless AC/DC power supply device, comprising:

an AC voltage input terminal;

a rectifier circuit, used to receive and rectifier the input AC voltage so as to output a rectified DC voltage;

a charging device, connected to the output terminal of said rectifier circuit at its input terminal and connected to the load at its output terminal so as to output a DC voltage; and a voltage detecting device, connected to the output terminal of said charging device at its input terminal and connected in a feedback configuration to the input control terminal of said charging device, so as to limit the charging voltage range of said charging device, said voltage detecting device including a reference voltage source and a comparison circuit connected to said reference voltage source at one of its input terminals, connected to the output terminal of a charging circuit of said charging device, and connected in feedback configuration to an input control terminal of a control circuit of said charging device for comparing the voltages of the charging devices with the voltage of said reference voltage source.

2. The coilless AC/DC power supply device as recited in claim 1, wherein said rectifier circuit is implemented by using one of a full-wave rectifier and a half-wave rectifier.

3. The coilless AC/DC power supply device as recited in claim 1, wherein said charging device comprises:

a control circuit, connected to the output terminal of said rectifier circuit at its input terminal and connected to the output terminal of said voltage detecting device at its input control terminal; and a charging circuit, connected to the output terminal of said control circuit at its input terminal and connected to the load at its output terminal, so as to output a DC voltage to the load.

4. The coilless AC/DC power supply device as recited in claim 3, wherein said control circuit includes at least one of a depletion-mode transistor and an enhancement-mode transistor.

5. The coilless AC/DC power supply device as recited in claim 4, wherein said depletion-mode transistor is implemented by using one of an n-JFET and an n-MOSFET.

6. The coilless AC/DC power supply device as recited in claim 4, wherein said enhancement-mode transistor is implemented by using one of a p-JFET and a p-MOSFET.

7. The coilless AC/DC power supply device as recited in claim 3, wherein said charging circuit includes at least one charging element such as a capacitor.

8. The coilless AC/DC power supply as recited in claim 1, wherein said comparison circuit includes at least one operational amplifier.

9. The coilless AC/DC power supply device as recited in claim 8, wherein said voltage detecting device is constructed mainly by using an operational amplifier, wherein the positive input terminal of said operational amplifier is connected to the output terminal of said control circuit of said charging device, the negative input terminal of said operational amplifier is connected to said reference voltage source and the output terminal of said operational amplifier is connected in a feedback configuration to the input control terminal of said control circuit of said charging device.

10. The coilless AC/DC power supply device as recited in claim 1, wherein said voltage detecting device comprises:
   a reference voltage source; and
   a comparison circuit, connected to the reference voltage source at one of its input terminals and connected to the output terminal of said charging circuit of said charging device; and
   a feedback voltage control circuit, connected in a feedback configuration to the input control terminal of said control circuit of said charging device, so as to compare the voltage of said charging element of said charging device with the voltage of said reference voltage source.

11. The coilless AC/DC power supply device as recited in claim 10, wherein said comparison circuit includes at least one operational amplifier.

12. The coilless AC/DC power supply device as recited in claim 10, wherein said feedback voltage control circuit includes a plurality of depletion-mode transistors such as p-MOS transistors and n-MOS transistors.

13. The coilless AC/DC power supply device as recited in claim 10, wherein said voltage detecting device is constructed mainly by using an operational amplifier, wherein the positive input terminal of said operational amplifier is connected to the output terminal of said charging circuit of said charging device, the negative input terminal of said operational amplifier is connected to said reference voltage source and the output terminal of said operational amplifier is connected to the gate of a CMOS composed of an n-MOS transistor and a p-MOS transistor as a inverter, wherein the source of said p-MOS transistor is connected in a feedback configuration to the positive input terminal of said operational amplifier, the source of said n-MOS transistor is connected to the ground and common drain of said p-MOS transistor and said n-MOS transistor is connected to the input control terminal of said control circuit of said charging device.

* * * * *